(12) United States Patent
Bell (10) Patent No.: US 6,705,550 B2
(45) Date of Patent: Mar. 16, 2004

(54) CLOSED CIRCUIT FUEL NOZZLE

(76) Inventor: Scot P. Bell, 228 W. High Sierra, Elk Ridge, UT (US) 84651

( * ) Notice: Subject to any disclaimer, the term of this patent is extended or adjusted under 35 U.S.C. 154(b) by 0 days.

(21) Appl. No.: 10/153,523

(22) Filed: May 20, 2002

(65) Prior Publication Data

US 2002/0175227 A1 Nov. 28, 2002

Related U.S. Application Data

(60) Provisional application No. 60/292,884, filed on May 22, 2002.

(51) Int. Cl.[7] ................................. B05B 1/34
(52) U.S. Cl. .................... 239/533.1; 239/569; 239/578; 239/579; 239/583
(58) Field of Search ................. 239/569, 578, 239/579, 586, 583, 533.1; 141/383, 384, 386

(56) References Cited

U.S. PATENT DOCUMENTS

| | | | |
|---|---|---|---|
| 2,556,221 A | 6/1951 | Samiran | 137/68 |
| 2,716,999 A | 9/1955 | Badger, Jr. et al. | 137/235 |
| 3,234,965 A | 2/1966 | Anderson | 137/614.04 |
| 3,336,944 A | 8/1967 | Anderson et al. | 137/614.04 |
| 3,662,793 A | 5/1972 | Calisher et al. | 141/198 |
| 3,669,472 A | 6/1972 | Nadsady | 285/87 |
| 3,674,061 A | 7/1972 | Calisher et al. | 141/198 |
| 4,638,842 A | 1/1987 | Hawley et al. | 141/302 |
| 4,919,174 A | 4/1990 | Warland | 141/384 |
| 5,405,120 A | 4/1995 | Kerpan et al. | 251/149.9 |
| 5,725,034 A | 3/1998 | Fry et al. | 141/347 |
| 5,765,610 A | 6/1998 | Brown | 141/383 |
| 5,904,302 A | 5/1999 | Brown | 239/586 |

OTHER PUBLICATIONS

Emco Wheaton Fleet Fueling, Corp., "G2266 Off–Highway Equipment Automatic Fueling System" (U.S.A., Feb. 1989).

*Primary Examiner*—Robin O. Evans
(74) *Attorney, Agent, or Firm*—Pate Pierce & Baird (57) ABSTRACT

A closed circuit fuel nozzle for engaging an adapter on a fuel tank. The nozzle may include a body having an inlet aperture, a tubular assembly, an outlet aperture, and walls forming a closed flow path from the inlet aperture to a tubular assembly. The distal end of the tubular assembly may form the outlet for the nozzle. The tubular assembly may comprise a tube extending in the longitudinal direction and a sealing collar secured proximate the distal end to form the outlet. An articulator may provide resilient articulation of the sealing collar with respect to the tube about lateral and transverse axes. A biasing member may urge the tubular assembly distally in the longitudinal direction. A poppet valve may be selectively translatable in the longitudinal direction and shaped to stop flow through the body when seated against the sealing collar.

15 Claims, 11 Drawing Sheets

CLOSED CIRCUIT FUEL NOZZLE

RELATED APPLICATIONS

This application claims the benefit of U.S. Provisional Application No. 60/292,884 filed on May 22, 2002, entitled CLOSED CIRCUIT FUEL NOZZLE.

BACKGROUND

1. The Field of the Invention

This invention relates to pressurized fluid transfer and, more particularly, to novel systems and methods of a closed circuit fuel nozzle.

2. The Background Art

It is often necessary to pump a fluid from one location to another. A nozzle may provide an interface that enables the fluid transport system (e.g. hose) to engage a tank to which a fluid (e.g. fuel) is being pumped. When it is necessary or desirable to pump at faster speeds and volumetric flow rates, it may be advantageous to provide a sealed or closed circuit system. In such situations, the nozzle may seal with an interface to provide a closed, sealed path for the fluid to travel from source to destination. The closed circuit design allows for higher fluid pressures for increased volumetric flow while preventing leakage.

Current closed circuit nozzles have several shortcomings. Typical nozzles are susceptible to wear. Wear becomes particularly apparent on the exterior sides of the fuel tank adapter. Several current nozzle designs seal against the exterior sides of the adapter. As a result, after limited use seal performance degrades and leaks begin. To avoid this problem, some nozzles seal against the end face of the adapter. Typically, the end face is not exposed to abrasion like the exterior sides. While an improvement, these abutment sealing nozzles are still very susceptible to wear. For example, with use, a nozzle may begin to sag when secured to the adapter. The sag may cause a missalignment between the abutment seal and the end face of the adapter resulting in leaks.

Current nozzles are also susceptible to contamination by dirt and grit. Dirt and grit can enter a nozzle and increase friction resistance to nozzle cycling. The increased resistance may prevent a nozzle from completely closing once the closing process has begun. Large, unprotected sliding surfaces, found in may current nozzles, are particularly prone to dirt and grit contamination.

In the event that a careless operator drives a vehicle away with a nozzle still attached, current nozzles do not provide a safety to prevent catastrophic nozzle failure and associated large scale fuel spills. Moreover, current nozzle designs are heavy and awkwardly shaped. A cumbersome nozzle often costs the operator extra strain and expenditure of effort as well as bruised knuckles and the like.

What is needed is a closed circuit fuel nozzle that provides seal articulation and motion to accommodate misalignment caused by wear. The nozzle should also minimize the size of sliding surfaces to lower nozzle cycling friction, thus insuring predictability and complete closure. The nozzle may provide a safety system to prevent fuel spills in the event of a nozzle break. Such a nozzle may be packed in a lightweight, ergonomic body formed to complement the hands of an operator.

BRIEF SUMMARY OF THE INVENTION

A closed circuit fuel nozzle in accordance with the present invention may be formed to engage a fuel tank adapter. In certain embodiments, the nozzle may have a body comprising an inlet aperture, a tubular assembly extending in a longitudinal direction, and walls forming a closed flow path from the inlet aperture to the tubular assembly.

In certain embodiments, a receiver may secure to the body to receive the fuel tank adapter. In an alternative embodiment, the receiver may be formed as part of the body. The receiver may house the tubular assembly and provide alignment between the tubular assembly and the fuel tank adapter. A distal end of the tubular assembly may form an outlet aperture from which fuel exits before entering the adapter.

The tubular assembly may translated in the longitudinal direction within the receiver. In certain embodiments, the tubular assembly consists of a tube extending in the longitudinal direction and a sealing collar secured proximate the distal end of the tube to form the outlet aperture. An articulator may be positioned between the tube and the sealing collar to provide resilient articulation of the sealing collar. The resilient articulation may permit the sealing collar to match the angle of the end face on the fuel tank adapter, thus ensuring a proper seal. In certain embodiments, a clamp may mechanically limit translation of the sealing collar with respect to the tube in the longitudinal direction.

A bias member may be positioned between the tubular assembly and the receiver to urge the tubular assembly in the longitudinal direction. The biasing member may provide resilient translation of more than 0.5 inches of the tubular assembly with respect to the body. In selected embodiments, the biasing member may be a coil spring aligned with the longitudinal direction to encircle the exterior of the tube. Thus, the spring may be positioned external to the flow path. A poppet valve selectively translatable in the longitudinal direction may be shaped to stop flow through the body when seated against the sealing collar in the longitudinal direction.

An actuator may be connected to the poppet valve to provide motion in the longitudinal direction thereto in response to a pressure communicated from the flow path. In certain embodiments, the poppet valve has a stem extending in the longitudinal direction to engage the actuator. The stem may have a pipette conduit formed substantially longitudinally therethrough to communicate the pressure within the flow path to the actuator. The actuator may include a piston translating in the longitudinal direction in response to the pressure communicated from the flow path via the pipette conduit to a selected side of the piston.

A closed circuit fuel nozzle in accordance with the present invention may be configured to fracture in a controlled manner so as to avoid fuel spills. In certain embodiments, the receiver of the nozzle may be scored to produce a weakened fracture line. Thus, in the event that a careless operator drives away with a nozzle still attached to a vehicle's fuel tank, the receiver is weakened to fracture at a specific location. The specific location may be selected such that the ability of the nozzle to stop flow therethrough is unaffected by a fracture.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 11, is not intended to limit the scope of the invention, as claimed, but is merely representative of the presently preferred embodiments of the invention.

The presently preferred embodiments of the invention will be best understood by reference to the drawings, wherein like parts are designated by like numerals throughout. Those of ordinary skill in the art will, of course, appreciate that various modifications to the embodiments described herein may easily be made without departing from the essential characteristics of the invention. Thus, the following description of the Figures is intended only by way of example, and simply illustrates certain presently preferred embodiments consistent with the invention.

Referring to FIGS. 1–9, a closed circuit fuel nozzle 10 in accordance with the present invention may be defined by a longitudinal direction 11a, a lateral direction 11b, and a transverse direction 11c. Generally, a nozzle 10 may be described as having a distal end 12 and a proximal end 14. A nozzle 10 in accordance with the present invention may have a body 16 or housing 16. The body 16 may have an inlet aperture 18 formed with an engager 20. In one embodiment, the engager 20 is a threaded region 20. The engager 20 may receive a hose, pipe, or other conduit for transporting a fluid.

The body 16 may have walls 22 aligned and connected to form a closed flow path 24 from the inlet aperture 18 towards an outlet 26. The distal end 12 of the body 16 may be aligned to direct a fluid passing through the flow path 24 in substantially the longitudinal direction 11a. The body may also have a handle 28 secured thereto by fasteners 29. The handle 28 may permit a user to easily carry the nozzle 10. The handle 28 may be formed of any suitable material. In one embodiment, the handle 28 is formed of an aluminum alloy.

In certain embodiments, the handle 28 may be positioned a distance from the body 16 measured in the transverse direction 11c. This distance may be selected to minimize torquing of the nozzle 10, with respect to the fuel tank adapter, about an axis extending in the lateral direction 11b. The distance may also be selected to permit the knuckles of an operator to adequately clear the body 16. In one embodiment, the distance is selected to be a balance between knuckle clearance and the torquing effect.

The body 16 may be formed of any suitable material. The material for the body 16 may be selected to provide desired strength, durability, non-reactivity, formability, weight, and the like. Suitable materials may include a polymer, fiber reinforced polymer, metal, metal alloy, composite, and the like. The body 16 may also be formed in any suitable manner. Suitable forming methods include molding, casting, welding, machining, and the like. In selected embodiments, the body 16 is cast out of an aluminum alloy.

An actuator system 30 may secure to the body 16 at the proximal end 14. The actuator system 30 may provide the on/off control for the nozzle 10. A receiver 32 may secure near the distal end 12 of the body 16. In certain embodiments, the receiver 32 may secure to the body 16 by a threaded engagement. In an alternative embodiment, the receiver 32 may be formed as an integral, monolithic unit with the body 16.

The receiver 32 may act to receive the adapter 33 to which the nozzle 10 will secure and communicate the fluid. In certain embodiments, the receiver 32 may house a tubular assembly 34. The tubular assembly 34 may provide the motion and sealing capacity to permit the nozzle 10 to seal with a corresponding adapter 33.

In selected embodiments, the tubular assembly 34 may include a tube 36 extending in the longitudinal direction 11a. A sealing collar 38 may secure to the tube 34 at the tube's 34 distal end 12. If desired, the tube 36 may have a flared section 39 to receive the sealing collar 38, thus permitting a wider diameter for the sealing collar 38 to reduce obstruction of the flow path 24. The sealing collar 38 may comprise a universal ring 40. A universal ring 40 in accordance with the present invention may be formed of any suitable material (e.g. composite, polymer, reinforced polymer, metal, metal alloy, and the like). Similarly, any suitable forming method may be applied. In one embodiment, the universal ring 40 is formed by turning brass on a lathe.

In one embodiment, the universal ring 40 may have a mechanical engagement 42 to secure a universal seal 44. The mechanical engagement 42 may be particularly useful for applications using caustic fluids. Caustic fluids, such as gasoline, may attack an adhesive used to secure the seal 44 to the ring 42. A mechanical engagement 42 may not be susceptible to such an attack. In applications using non-caustic fluids, the mechanical engagement 42 may be omitted in favor of an adhesive.

A universal seal 44 in accordance with the present invention may include several sealing surfaces and edges. For example, a universal seal 44 may include an abutment seal 46, a circumferential seal 48, and a sealing surface 50 extending from the abutment seal 46 to the circumferential seal 48. In certain embodiments, multiple circumferential seals 48 may be included to improve sealing capacity. A universal seal 44 in accordance with the present invention may be formed of any suitable material. A suitable material may provide a desired level of resiliency and wear resistance. In one embodiment an elastomeric material is used for the universal seal 44.

A nozzle 10 in accordance with the present invention may include a poppet valve 52 to selectively restrict flow in the flow path 24. In selected embodiments, the poppet valve 52 may have an inner diameter surface 54 and an outer diameter edge 56. The inner diameter surface 54 may be sized and shaped to correspond to the circumferential seal 48. The outer diameter edge 54 may act as a guard to protect the inner diameter surface 54 from scratches and scoring. Additionally, in certain embodiments, the outer diameter edge 56 may provide additional seal capacity as the edge 56 is pressed against the sealing surface 50.

A poppet valve 52 may be formed of any suitable material. The material for the poppet valve 52 may be selected to provide desired strength, durability, non-reactivity, formability, weight, and the like. Suitable materials may include a polymer, fiber reinforced polymer, metal, metal alloy, composite, and the like. The poppet valve 52 may also be formed in any suitable manner. Suitable forming methods include molding, casting, machining, and the like. In one embodiment, the poppet valve 52 is turned on a lathe out of an aluminum alloy.

A poppet valve 52 in accordance with the present invention may also have a face 58 extending in the lateral and transverse directions 11b, 11c. The face 58 typically acts to engage and then displace a corresponding poppet 60 on the adapter 33 in the longitudinal direction 11a. If desired, an alignment post 62 may be added to the poppet face 60 to ensure proper alignment with the adapter poppet 60. Additional apertures or structures 64 may be added to the poppet face 58 as needed or desired.

A stem 66 may extend from the poppet valve 52 in the longitudinal direction 11a towards the proximal end 14 of the nozzle 10. The stem 66 may act to communicate motion in the longitudinal direction 11a from the actuator system 30 to the poppet valve 52. A flare 68 may provide the transition from the stem 66 to the poppet valve 52. The angle 70 that the flare 68 makes with respect to the flow path 24 may be selected to create or promote desirable flow characteristics.

The stem 66 may be formed of any suitable material. The material for the stem 66 may be selected to provide desired strength, durability, non-reactivity, formability, weight, and the like. Suitable materials may include a polymer, fiber reinforced polymer, metal, metal alloy, composite, and the like. In certain embodiments, the stem 66 is monolithically formed with the poppet valve 52 out of an aluminum alloy.

The stem 66 may be supported by spokes 72 extending from the interior of the tube 36 towards the center of the flow path 24. The shape, number, angle with respect to the tube 36, and location of the spokes 72 may be selected to provide adequate support while minimally disturbing the fluid in the flow path 24. In one embodiment, two spokes 72 extend to support an annulus 74 through which the stem 66 may translate. A stop 76 may be formed on the stem 66 to engage the annulus 74 when the poppet valve 52 is properly seated against the universal seal 44. The stop 76 may prevent the poppet valve 52 from overly compressing the universal seal 44, thus greatly prolonging the universal seal's 44 effective life.

An articulator 78 may separate the tube 36 from the sealing collar 38 in the longitudinal direction 11a. In certain embodiments, the flared section 39 of the tube 36 may form a shoulder 80 on which the articulator 78 may rest. The articulator 78 may support articulation of the sealing collar 38 with respect to the tube 36. This motion allows the sealing collar 38 to maintain abutment with the end face 81 of adapter 33, even at various angles of alignment. Thus, when a receiver 32 or adapter 33 begins to wear from use, the articulator 78 allows the sealing collar 38 to tilt about an axis extending in the lateral direction 11b, an axis extending in the transverse direction 11c, or any combination of the two, to compensate for the misalignment caused by the wear.

In selected embodiments, the articulator 78 is annular in shape, thus allowing the flow path 24 to extend therethrough. An articulator 78 in accordance with the present invention may be formed of any suitable material. In certain embodiments, the articulator 78 is formed of a resilient elastomer. In another embodiment, the articulator 78 is a washer-like wave spring formed of steel. In an alternative embodiment, the acticulator 78 comprises multiple wave springs.

In certain embodiments, the sealing collar 38 is held against the articulator 78 in the longitudinal direction 11a by a clamp 82. In one embodiment, the clamp 82 is a cylinder 82 having a lip 84 resisting travel of the universal ring 40 in the longitudinal direction 11a. A locking ring 86 may locate the clamp 82 with respect to the tube 36. If desired, the clamp 82 may use the lip 84 and the locking ring 86 to maintain the articulator 78 in a slight compression. A clamp 82 in accordance with the present invention may be formed of any suitable material. In certain embodiments, the clamp 82 is formed of an aluminum alloy.

An "O-ring" seal 88 may be place circumferentially between the universal ring 40 and the flared section 39. The "O-ring" seal 88 may substantially prevent the fluid from exiting the tubular assembly 34 at a location other than the outlet 26.

In selected embodiments, the clamp 82 may provide a sliding surface 90 for the tubular assembly 34 as it translates in the longitudinal direction 11a inside the receiver 32. The amount of sliding surface 90 may be selected to minimize friction with the receiver 32. As a receiver 32 is often open to the surrounding atmosphere, dirt and other particles can enter therein. Dirt and grit may become lodged between the clamp 82 and receiver 32 at the sliding surface 90, thus causing increased wear and translational resistance. By minimizing the sliding surface 90, dirt and grit plays less of role in the friction between the tubular assembly 34 and the receiver 32. Moreover, a small sliding surface 90 is more likely to clear itself of dirt and grit during translation. In one embodiment, the sliding surface 90 is about one-eighth of an inch in width (measured in the longitudinal direction 11a).

A scraper seal 92 may encircle the tube 36 on the proximal side 14 of the sliding surface 90. The scraper seal 92 may substantially prevent contaminants (i.e. water, dirt, grit, and the like) that passed the sliding surface 90 from enter any deeper into the nozzle 10. If necessary, a spacer 94 may be positioned between the scraper seal 92 and the locking ring 86 to provide an even and distributed loading of the scraper seal 92 as it is forced thereagainst in the longitudinal direction 11a by a biasing member 96. In selected embodiments, the spacer 94 and the scraper seal 92 may be formed as an integral unit such as by insert molding or the like.

The biasing member 96 provides the force for resiliently translating the tubular assembly 34 with respect to the receiver 32 (or any part of the body 16) in the longitudinal direction 11a. In one embodiment, the biasing member 96 is a coil spring extending in the longitudinal direction to encircle the tube 36. Thus, the biasing member 96 may be placed outside of the flow path 24. A shoulder washer 98 may be placed between the biasing member 96 and the scraper seal 92 to properly align the biasing member and to protect the seal 92. In certain embodiments, the spacer 94, scraper seal 92, and shoulder washer 98 may be formed as an integral unit such as by insert molding and the like.

A receiver 32 in accordance with the present invention may have a sliding surface 100 shaped and dimensioned to encircle a portion of the tube 36. The sliding surface 100 may act to align the tubular assembly 34 within the receiver 32 during translation of the tubular assembly 34 with respect to the receiver 32. In selected embodiments, the sliding surface 100 is protected from dirt and grit by the scraper seal 92. Additionally, translation of the tubular assembly 34 may expose the siding surface 100 to cleaning by the fluid in the flow path 24. Thus, sliding surface 100 (as opposed to sliding surface 90) can be wider in the longitudinal direction 11a without significant adverse affects. An "O-ring" seal 102 may be placed circumferentially between the receiver 32 and the tube 36 at the sliding surface 100. The "O-ring" seal 100 may substantially prevent the fluid from exiting the nozzle 10 at a location other than the outlet 26.

The receiver 32 maybe formed of any suitable material. The material for the receiver 32 may be selected to provide desired strength, durability, non-reactivity, formability, weight, and the like. Suitable materials may include a polymer, fiber reinforced polymer, metal, metal alloy, composite, and the like. The receiver 32 may also be formed in any suitable manner. Suitable forming methods include molding, casting, welding, extrusion, hammer extrusion, machining, and the like. In selected embodiments, the receiver 32 is turned on a lathe out of an aluminum alloy.

A receiver 32 in accordance with the present invention may secure to the body 16 in any suitable manner. In one embodiment, the receiver 32 engages the body 16 in a threaded assembly. An "O-ring" seal 104 may be placed circumferentially between the receiver 32 and the body 16. The "O-ring" seal 104 may substantially prevent the fluid from exiting the flow path 24 at the seam between the receiver 32 and body 16.

Vents 106 may be placed in the receiver 32 to allow air to escape from a clearance space 108 surrounding the biasing member 96 as the tubular assembly 34 translates back and forth in the longitudinal direction 11a. In one embodiment, the vents 106 are made by forming an aperture (i.e. by drilling) though the receiver to open the clearance space 108 to the surrounding atmosphere. A filter 110 may be place in the vents 108 to restrict the flow of dirt, grit, and other contaminants into the nozzle 10 through the vents 108. In one embodiment, the filters 110 are small felt plugs.

In selected embodiments, a retainer 112 may attach to the receiver 32 to selectively secure an adapter 33 with respect to the receiver 32 in the longitudinal direction 11a. In one embodiment, the retainer 112 may be a ring of multiple deflectable engagement teeth 114. The teeth 114 may be shaped and dimensioned to engage a corresponding groove 116 in the adapter 33. A retainer sleeve 118 circumferentially surrounding the engagement teeth 114 may selectively prevent the teeth 114 from engaging or disengaging the adapter 33. That is, when the retaining sleeve 118 is translated towards the proximal end 14 of the nozzle 10, the adapter 33 may be introduced into the receiver 32 by deflecting the teeth 114 outward. Once the adapter 33 has been properly aligned, the teeth 114 will engage the corresponding groove 116. The retaining sleeve 118 may then be translated towards the distal end 12 of the nozzle 10 and prevent the teeth 14 from flexing outward and disengaging the groove 116.

The retainer 32 may be formed of any suitable material having the requisite deflectability and resiliency. The material for the retainer 32 may be selected to provide desired strength, durability, non-reactivity, formability, weight, and the like. Suitable materials may include a polymer, fiber reinforced polymer, composite, elastomer, and the like. The retainer 32 may be formed by any suitable method. Suitable methods may include casting, molding, machining, and the like.

The retainer 112 may be held between a shoulder 120 on the receiver 32 and a locking ring 122. An attachment ring 124 may encircle the receiver 32. The retainer sleeve 118 may be secured to the attachment ring 124 with fasteners 126. The attachment ring 124 may provide a surface 128 against which a biasing member 130 may act, urging the retaining sleeve 118 toward the distal end 12 of the nozzle 10. Thus, positioning the retainer sleeve 118 over the retainer 112 to prevent release of the adapter 33. The retainer 112 may form a stop to prevent the biasing member 130 from pushing the retainer sleeve 118 all the way off of the receiver 32.

In certain embodiments, a wear ring 132 may also encircle the receiver 32. The wear ring 132 may provide a sliding surface 134 to guide the translation of the retainer sleeve 118. The wear ring 132 may also provide a stop against which the biasing member 130 may act. Additionally, the wear ring 132 may act as a retainer to maintain the filters 110 in their proper locations.

An end bumper 136 may act to protect the nozzle 10, as well as the apparatus to which the nozzle 10 is to secure, from dings and nicks. A handle 138 may provide a user with a location to manipulate (i.e. translate in the longitudinal direction) the retainer sleeve 118. In certain embodiments, the retainer sleeve 118 is free to rotate with respect to the rest of the nozzle 10 about an axis extending in the longitudinal direction 11a. This rotation may permit the user to move the retainer sleeve handle 138 to a location providing the most clearance for a particular fluid transfer operation.

The retainer sleeve handle 138 may be placed an ergonomic distance from the main handle 28. The distance between the handles may be selected to allow a user to hold the nozzle 10 in place with the main handle 28 while retracting the retainer sleeve handle 138 using the same hand. The distance and location of the handles 28, 138 may be selected to allow operation by a user wearing gloves.

The retainer sleeve 118 may be formed of any suitable material. The material for the retainer sleeve 118 may be selected to provide desired strength, durability, non-reactivity, formability, weight, and the like. Suitable materials may include a polymer, fiber reinforced polymer, metal, metal alloy, composite, and the like. In selected embodiments, the retainer sleeve 118 is cast out of an aluminum alloy.

A receiver 32 in accordance with the present invention may have a secondary seal 140 to seal the receiver 32 with an adapter 33. In certain embodiments, the secondary seal 140 may be a "U-cup" seal. While the secondary seal 140 may be more susceptible to wear, the seal 140 may still provide an additional safeguard against leakage.

In certain embodiments, the receiver 32 may be scored to form a weakened fracture line 142. The fracture line 142 may be placed in the receiver 32 at a location close enough to the distal end 12 of the nozzle 10 such that, in the event of fracture and separation, the functions of the tubular assembly 34 will not be interrupted. The fracture line 142 may also be placed to separate, in the event of a fracture, the retainer 112 from the rest of the nozzle 10. In certain embodiments, the separation of the retainer 112 removes the stop that prevented the biasing member 130 from pushing the retaining sleeve 118 off the distal end 12 of the nozzle 10. Thus, once the receiver 32 fails along the fracture line 142, the retaining sleeve 113 may be jettisoned from the nozzle 10.

Figure 7:
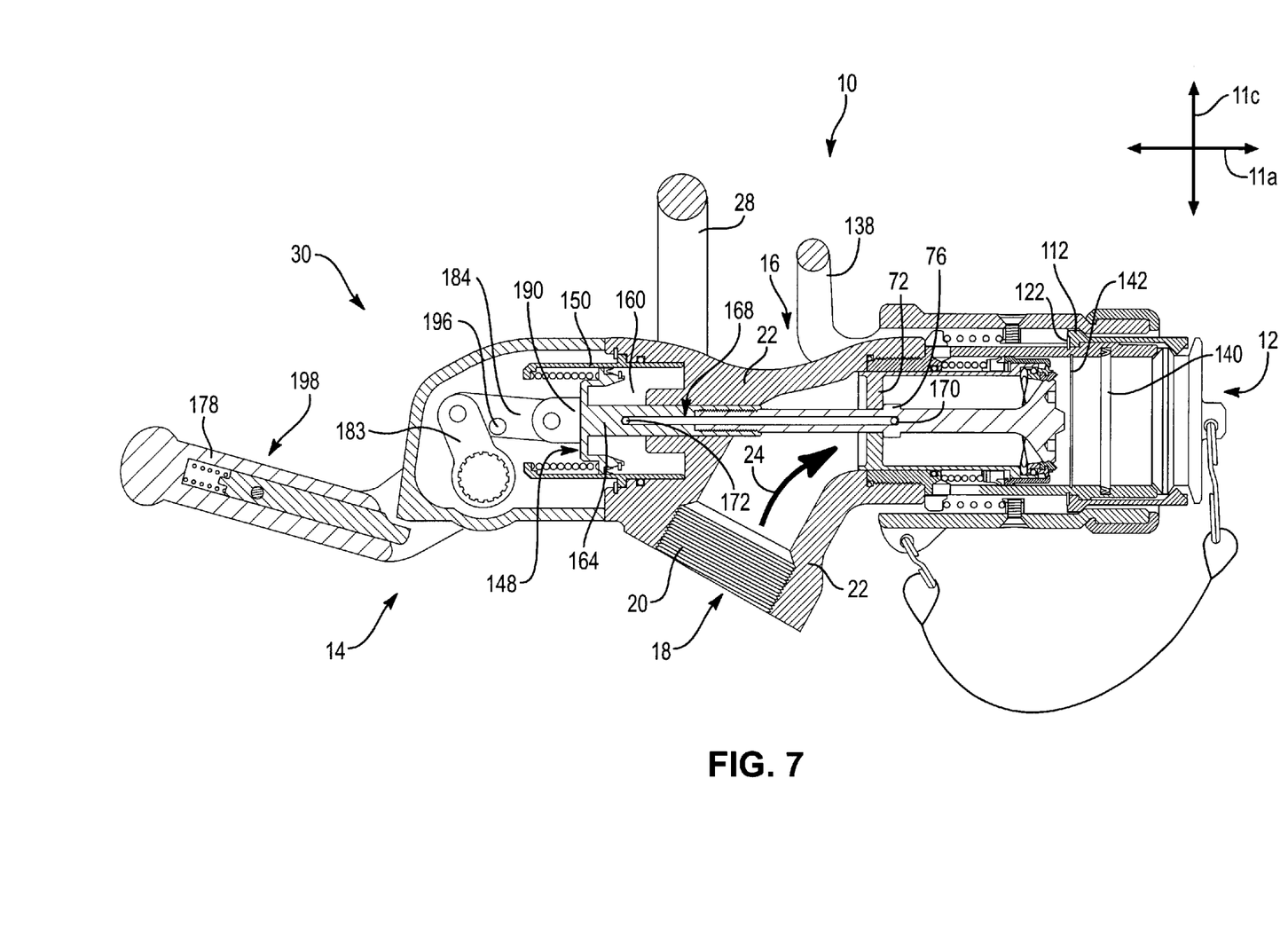
FIG. 7 is a cut-away, side elevation view of an embodiment of a nozzle in accordance with the present invention in the "off" position with the retaining sleeve retracted and the dust cap installed.

In selected embodiments, a dust cap 144 may be shaped to be engaged by the retainer 112 while covering the outlet 26. The dust cap 144 may protect the internal components of the nozzle from contamination when the nozzle 10 is not in use. A dust cap 144 in accordance with the present invention may be formed of any suitable material. In one embodiment, the end cap 144 is molded of a polymer. If desired, the dust cap 144 may be secured to the retainer sleeve 118 (or any other suitable part of the nozzle 10) by a tether 146.

In selected embodiments, the actuator system 30 may comprise a piston 148 sliding in the longitudinal direction 11a within a piston cylinder 150. A seal 152 may resist the passage of fluids from one side of the piston 148 to the other. In one embodiment, the seal 152 may be a "U-cup" seal ring. A locking ring 154 may maintain the seal 152 in a proper location between the piston 148 and the piston cylinder 150. A biasing member 156 may urge the piston 148 toward the distal end 12 of the piston cylinder 150.

The piston cylinder 150 may be held against the more proximal end 14 of the body 16 by a locking ring 158. The walls 22 of the body 16, piston cylinder 150, and one side of the piston 148 may form a chamber 160. An "O-ring" seal 162 may resist the escape of fluid from the chamber 160 at the seam between the piston cylinder 150 and the body 16.

A piston extension 164 may extend through an aperture 166 in a wall 22 of the body 16 in the longitudinal direction 11a to engage the stem 66 of the poppet valve 52. In other embodiments, the stem 66 may extend through the aperture 166 to engage the piston 148. Thus, as the piston 148 translates in the longitudinal direction 11a, the poppet valve 52 simultaneously and correspondingly translates in the longitudinal direction 11a.

The piston 148 and piston cylinder 150 may be formed of any suitable material. The material for the piston 148 and piston cylinder 150 may be selected to provide desired strength, durability, non-reactivity, formability, weight, and the like. Suitable materials may include a polymer, fiber reinforced polymer, metal, metal alloy, composite, and the like. The piston 148 and piston cylinder 150 may also be formed in any suitable manner. Suitable forming methods include molding, casting, welding, machining, and the like. In selected embodiments, both the piston 148 and the piston cylinder 150 are machined out of an aluminum alloy.

A pipette conduit 168 may be formed within the stem 66 of the poppet valve 52. The piston extension 164 may have a corresponding pipette conduit 168. The pipette conduit 168 may have an inlet 170 position on the stem 66 so as to be in the flow path 24. An outlet 172 may be formed in the piston extension 164 at a location on the distal side 12 of the piston 148. Thus, the pipette conduit 168 may communicate and conduct the pressure present in the flow path 24 to the piston chamber 160. If the communicated pressure is sufficient to overcome the force of the biasing member 156, then the piston 148 will move toward the proximal end 14 of the nozzle 10 and seats the poppet valve 52 against the universal seal 44.

The piston 148 and piston cylinder 150 may be enclosed by an end cap 174. Fasteners 176 may abut the end cap 174 against the most proximal end 14 of the body 16. The end cap 174 may act to protect the piston 148 and piston cylinder 170. An end cap 174 in accordance with the present invention may be formed of any suitable material. The material may be selected to provide desired strength, durability, non-reactivity, formability, weight, and the like. Suitable materials may include a polymer, fiber reinforced polymer, metal, metal alloy, composite, and the like. The end cap 174 may also be formed in any suitable manner. Suitable forming methods include molding, casting, welding, machining, and the like. In selected embodiments, the end cap 174 is cast out of an aluminum alloy.

The end cap 174 may provide a location to secure a manual on/off lever 178 for manipulating the motion of the piston 148 and, correspondingly, the poppet valve 52. The lever 178 may secure the ends of a shaft 180 extending through the end cap 174 in the lateral direction 11b. Bushings 181 may be mounted in the end cap 174 to support rotation of the shaft 180 with respect to the end cap 174. Locking rings 182 may secure the lever 178 to the shaft 180. In certain embodiments, the shaft 180 may be a splined shaft to prevent backlash and provide a better rotational securement between the lever 178 and the shaft 180. Additionally, if desired, bushings 181 have a circular aperture that may be used in combination with a spline shaft 180 to provide multiple vents permitting air to travel in and out of the end cap 174. A pair of lever arms 183 may rotationally secure to the part of the shaft 180 inside the end cap 174. The lever arms 183 may pivotably secure a link 184 therebetween with a pin 186 and appropriate locking rings 188.

In certain embodiments, the piston 148 may have a pivot tab 190 extending in the longitudinal direction 11a from the proximal side 14 of the piston 148. The pivot tab 190 may pivotably secure the link 184 with a pin 192 and locking rings 194. Thus, upon rotation of the shaft 180, the lever arms 183 pull the link 184, which in turn pulls on the pivot tab 190 and translates the piston 148 in the longitudinal direction 11a. The link 184 may have a stop 196 formed thereon to stop rotation between the lever arms 183 and the link 184 when a maximum translation of the piston 148 in the longitudinal direction 11a has been achieved.

It is often desirable to minimize eccentric or side loadings between the piston 148 and the piston cylinder 150. Side loadings increase friction, create rougher cycling of the piston 148, and increase the force necessary to cycle the piston 148. The length of the lever arms 183, link 184, and pivot tab 190 may be selected to minimize eccentric loading of the piston 148. That is, the lever arms 183, link 184, and pivot tab 190 may be located so as to push or pull the piston 148 in a direction as nearly aligned with the longitudinal direction as possible.

To further minimize side loading of the piston 148 on the piston cylinder 150, the body 16 may be formed to include an alignment extension 197 extending into the piston chamber 160 toward the proximal end 14 of the nozzle 10. The piston 148 may be formed to overlap the alignment extension 197 in the longitudinal direction 11a. An overlapping piston 148 may minimize the length of the piston extension 164 that is unsupported in the lateral and transverse directions 11b, 11c with respect to the location where the piston 148 slides against the piston cylinder 150. The shorter length from the last support (i.e. the most distal end 12 of the alignment extension 197) to the contact between the piston 148 and the piston cylinder 150, the more rigid the assembly and the smaller the side loadings.

In certain embodiments, the alignment extension 197 may act as a stop to limit the motion of the piston 148 in the longitudinal direction 11a toward the distal end 12 of the nozzle 10. An alignment extension 197 in accordance with the present invention may be slotted, drilled, or otherwise modified to provide a location for the outlet aperture 172 of the pipette conduit 168 to vent to the piston chamber 160. Such a slot or aperture may also act to distribute fluid evenly across the entire face of the piston 148.

The on/off lever 178 may have a lock 198 to maintain the nozzle 10 off once the on/off lever 178 has rotated past a certain point. In selected embodiments, the lock 198 may consist of a locking pin 200 extending from the on/off lever 178. A biasing member 202 may urge the locking pin 200 outward from the on/off lever 178. A tension pin 204 with corresponding knobs 206 may extend through the on/off lever 178 and the locking pin 198 in the lateral direction 11b. A slot 208 may be formed in the on/off lever 178 to permit the tension pin 204 to translate a limited distance with the locking pin 200. Thus, the tension pin 204 and knobs 206 may form a handle for manipulating (translating) the locking pin 200 while providing a stop to prevent the biasing member 202 from completely jettisoning the locking pin 20 from the on/off lever 178.

The end cap 174 may have a locking edge 210. In certain embodiments, as the on/off lever 178 travels to the "off" position, the locking edge 210 may force the locking pin 200 against the biasing member 202. The on/off lever 178 may be angled with respect to the locking edge 210 so that the locking pin 200 is pushed in a direction parallel to the locking pin's 200 major axis. Thus, side loading of the locking pin 200 with respect to the on/off lever 178 may be reduced and friction therebetween lower. Once the locking pin 200 has cleared the locking edge 210, the biasing member may extend the locking pin 200 and prevent the on/off lever 178 from inadvertently returning to the "on" position. The lock 189 may be manually released by using the knobs 206 to translate the locking pin 200 until it releases the locking edge 210.

Components of the lock 198 and on/off lever 178 may be formed of any suitable material. The material for each component may be selected to provide a desired strength, durability, non-reactivity, formability, weight, and the like. Suitable materials may include a polymer, fiber reinforced polymer, metal, metal alloy, composite, and the like.

Figure 1:
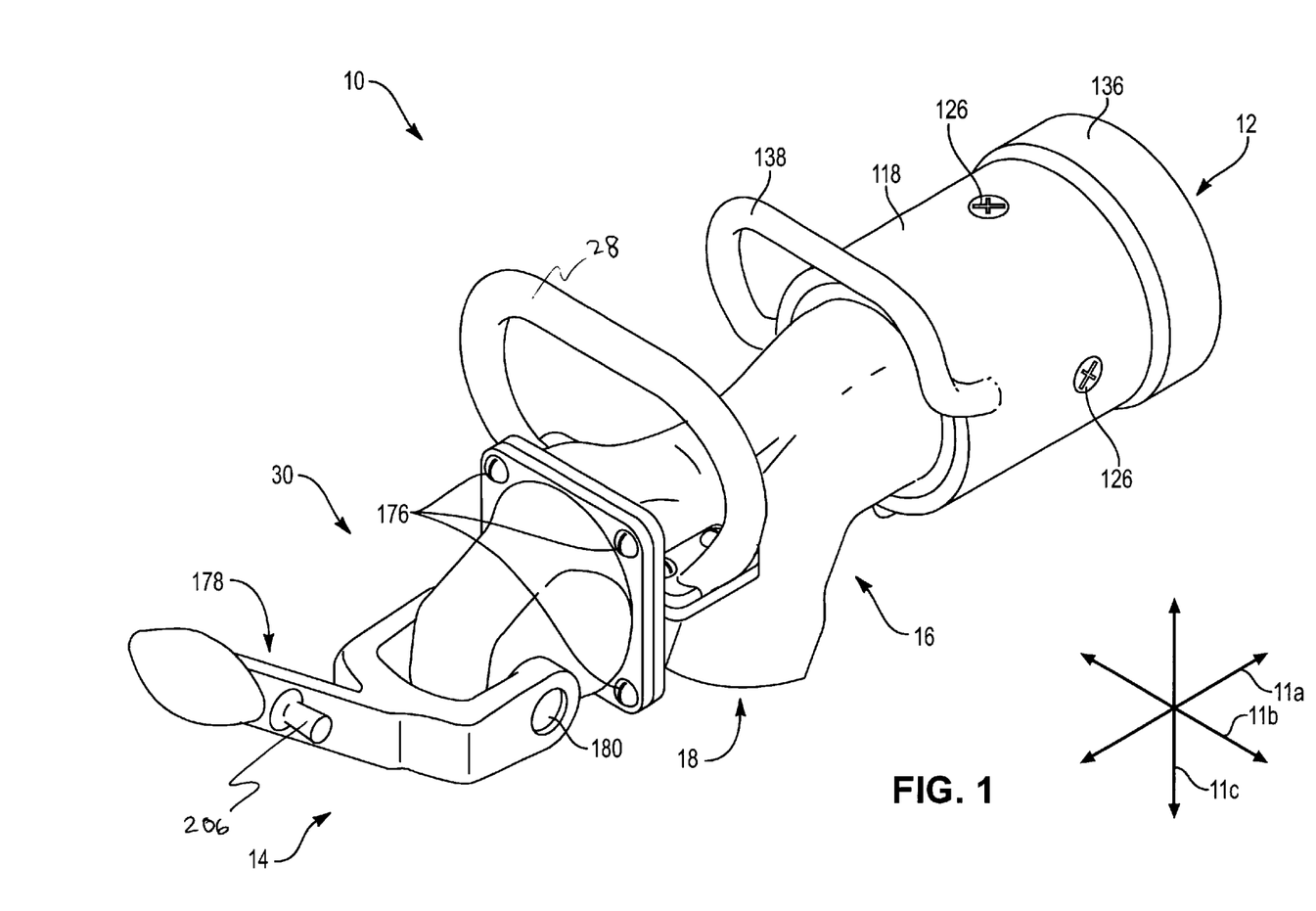
FIG. 1 is a perspective view of an embodiment of a nozzle in accordance with the present invention in the "on" position.
Figure 2:
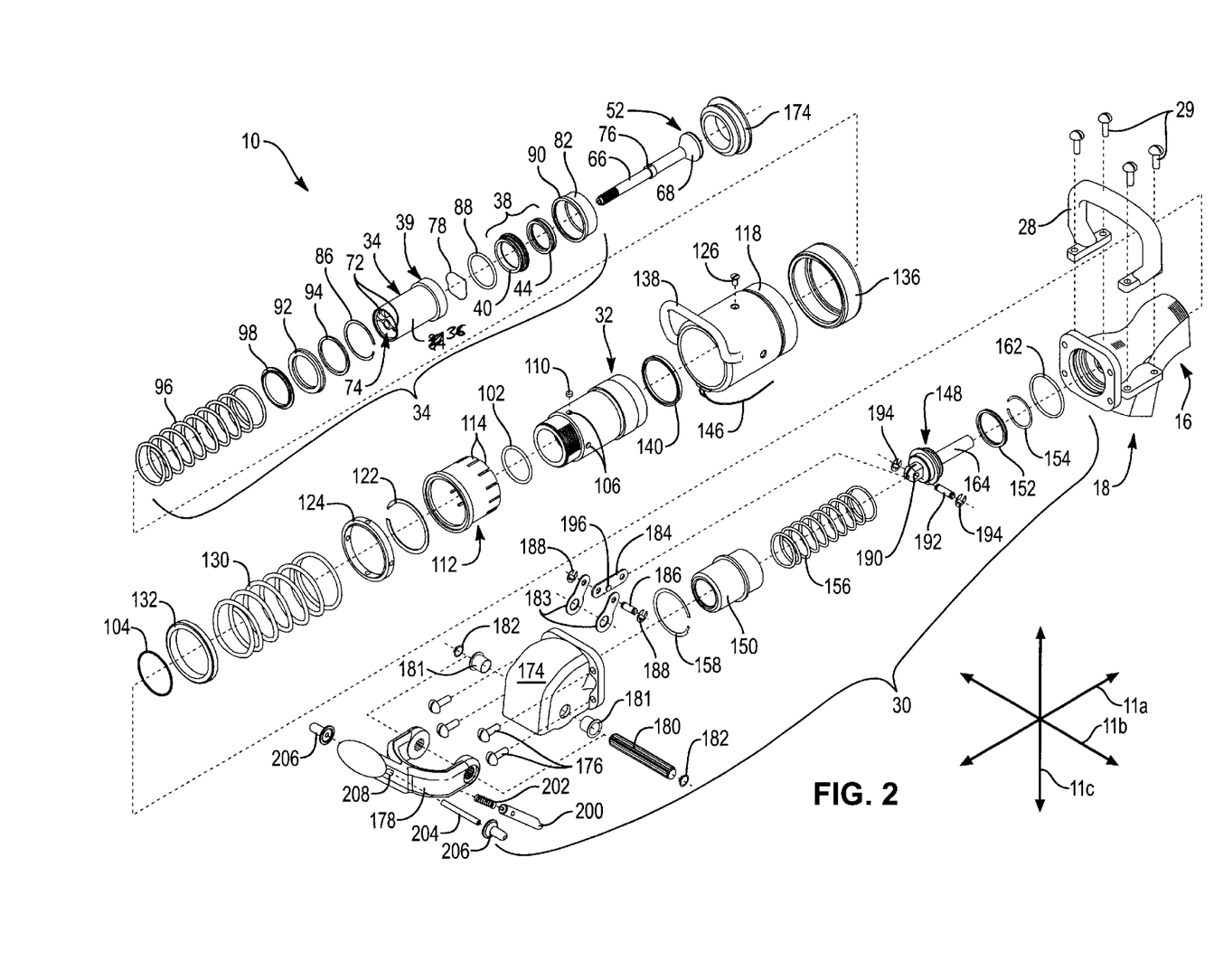
FIG. 2 is a perspective, exploded view of a nozzle in accordance with the present invention.
Figure 3:
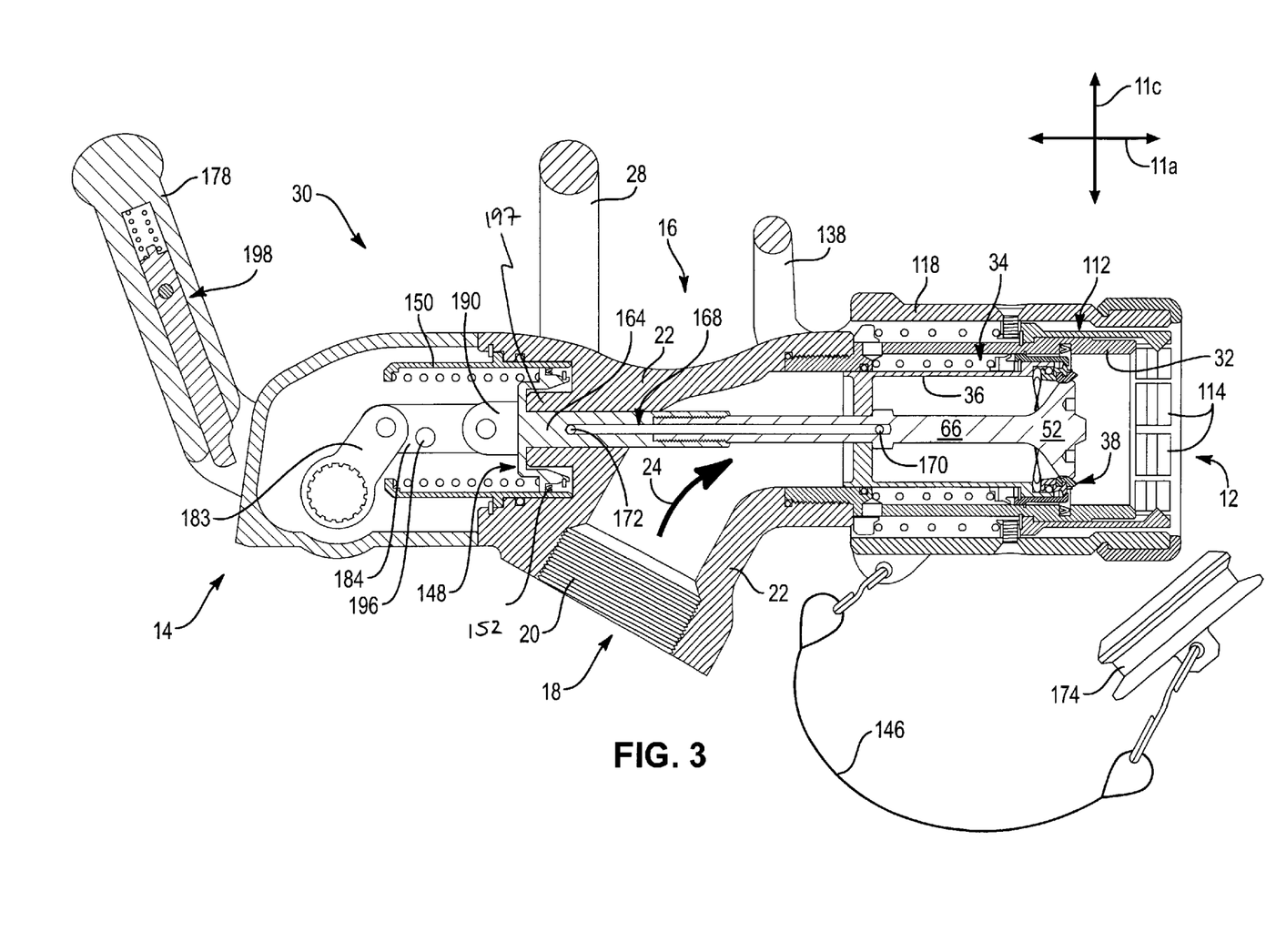
FIG. 3 is a cut-away, side elevation view of an embodiment of a nozzle in accordance with the present invention in the "on" position without an adapter attached.
Figure 4:
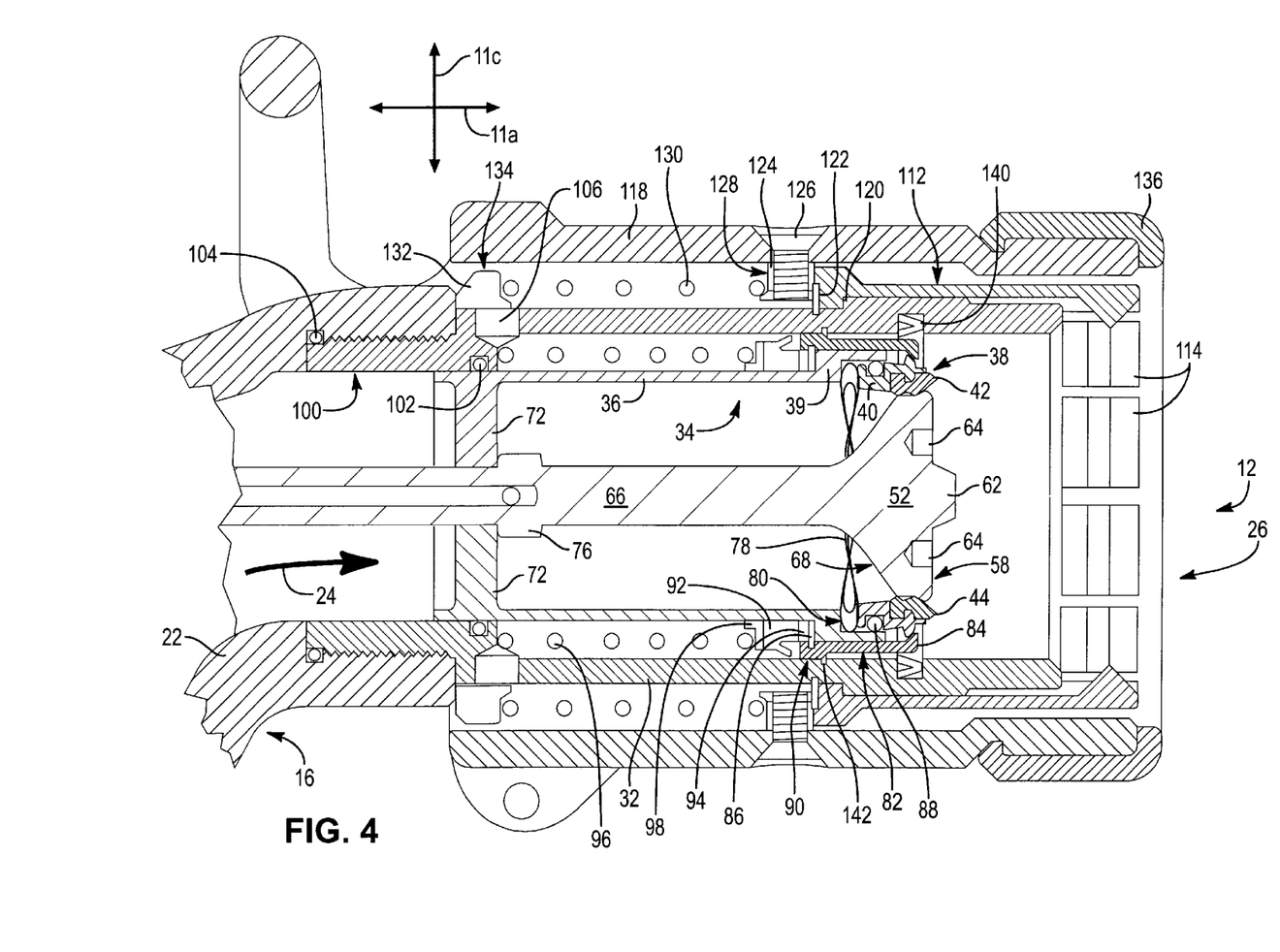
FIG. 4 is a close-up, cut-away, side elevation view of the distal end of the nozzle embodiment of FIG. 3.
Figure 5:
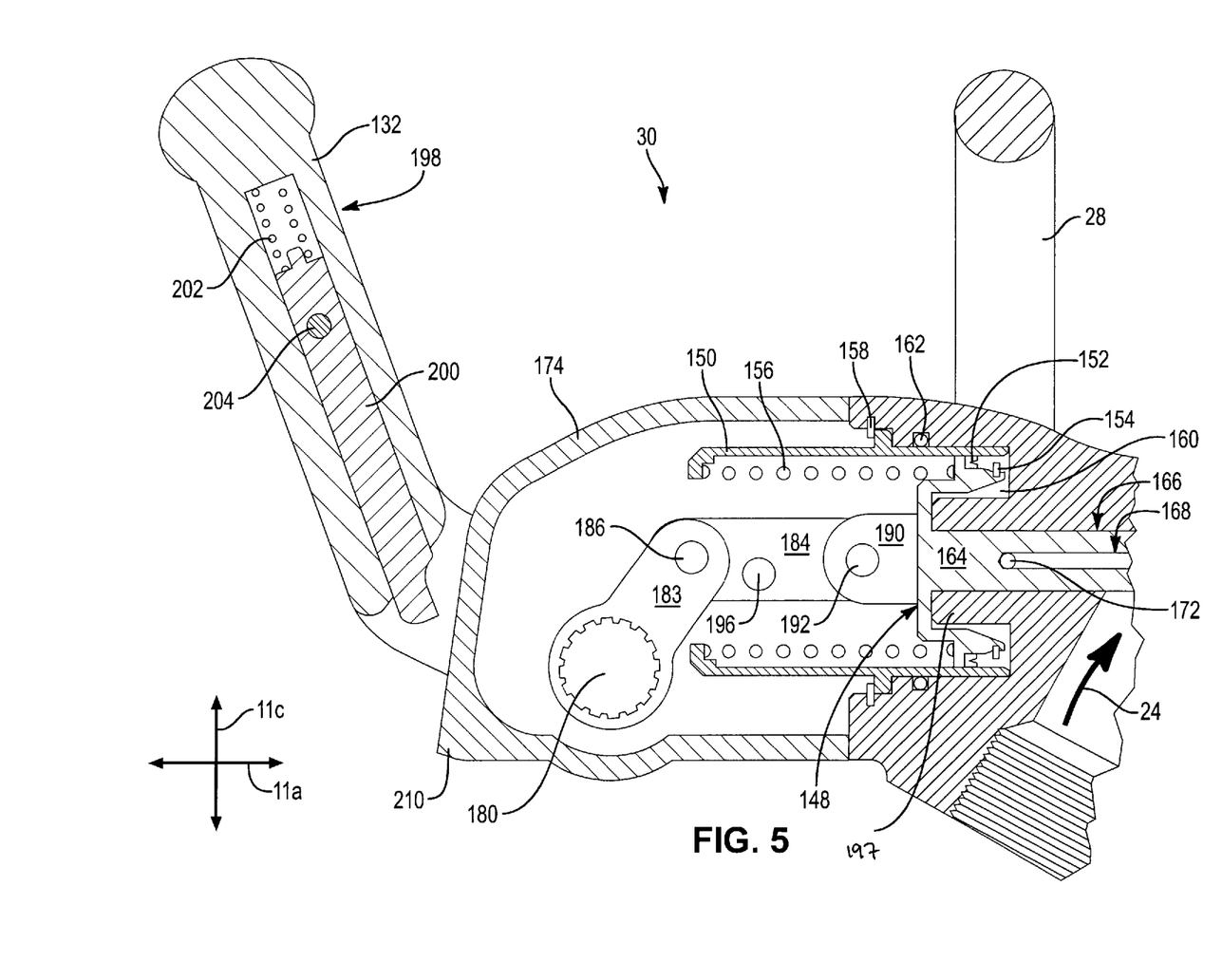
FIG. 5 is a close-up, cut-away, side elevation view of the proximal end of the nozzle embodiment of FIG. 3.

Referring to FIGS. 3–5, a nozzle 10 is illustrated with the on/off lever 178 in the "on" position. The piston 148 located at the distal end 12 of the piston cylinder 150. While the nozzle 10 is in the "on" position there will be no flow because no adapter has been introduced into the receiver 32. With no receiver 32 to inhibit the tubular assembly's 34 travel in the longitudinal direction 11a, biasing member 96 advances the tubular assembly 34 until the poppet valve 52 seats on the sealing collar 38 and the stop 76 resists further travel.

Figure 6:
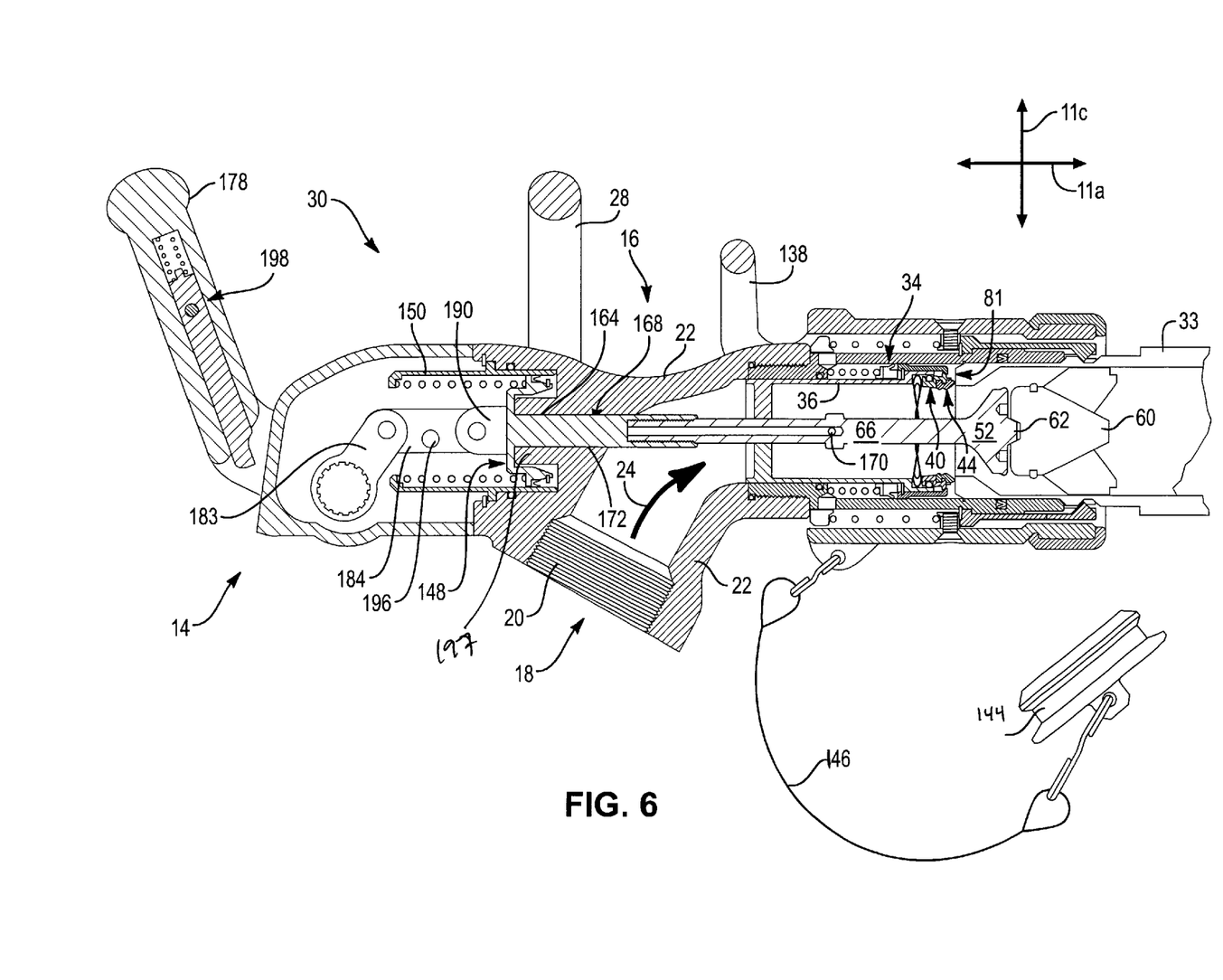
FIG. 6 is a cut-away, side elevation view of an embodiment of a nozzle in accordance with the present invention in the "on" position with an adapter attached.

Referring to FIG. 6, a nozzle 10 is illustrated with the on/off lever 178 in the "on" position. An adapter 33 has been admitted into the receiver 32 and is being secured by the retainer 112. The presence of the adapter 32 inhibits the tubular assembly 34 from advancing in the longitudinal direction 11a. Instead, the biasing member 96 forces the universal seal 44 against the end face 81 of the adapter 33. The articulator 78 permits the sealing collar 38 to tilt and adjust to the angle of the end face 81 ensuring that the universal seal 44 is uniformly compressed.

In the "on" position, the poppet valve 52 displaces the poppet 60 of the adapter 33 such that the fluid is free to travel through the nozzle 10 and enter the adapter 33. As the velocity of a fluid in the flow path 24 increases, so does the head pressure in the flow path 24. The increase in head pressure is necessary to generate the higher velocities in the flow path 24. Thus, the increase in head pressure is proportional to the increase in velocity. Head pressure would be sufficient to move the piston 148 and close the nozzle 10, however, fluids traveling over the inlet 170 generate a vacuum in the pipette conduit 168. The strength of the vacuum is proportional to the velocity of the fluid. The greater the velocity, the greater the vacuum drawn.

Tests of the present invention have shown that when the inlet 172 is located on the stop 76, or otherwise spaced from the poppet valve 52, the increase in head pressure is nullified by the increase in vacuum strength. As a result, high volumetric flow, even in excess of 180 gpm, does not move the piston 148 to close the nozzle 10 even when the head pressures to generate those rates of flow are quite high (approximately 80 psi or more than sufficient to otherwise overcome the piston biasing member 156). Thus, by placing the inlet 172 a selected distance from the poppet valve 52, shut-off pressure is substantially independent of volumetric flow rates.

Typically, once the fluid in the tank to which the adapter 33 is attached reaches a certain level, the tank begins to build back pressure. The back pressure is communicated by the fluid back into the flow path 24. The back pressure is not cancelled by the vacuum effect and is independent of flow velocity, therefore, back pressure may be communicated to the piston chamber 160. If the higher pressure is able to overcome the biasing member 156, the piston will begin moving and cause the nozzle 10 to close.

Positioning the inlet 170 some distance away from the poppet valve 52 lessens the likelihood that the pipette conduit 168 will conduct any stagnation pressure to the piston chamber 160. A stagnation pressure is created when the fluid in the flow path 24 collides with the flare 68 of the poppet valve 52. Stagnation pressures are likely to upset the balance between head pressure and vacuum and cause the nozzle 10 to close prematurely.

The spring constant of the piston biasing member 156, as well as the cumulative friction of the components of the nozzle 10, determines at what pressure the nozzle 10 will close. A higher spring constant requires that a higher back pressure be created in the tank before the biasing member 156 can be overcome. However, the angle 70 that the flare 68 makes with the respect to the flow path 24 may be selected to compensate for the piston biasing member 156. The more perpendicular the flare 68 to the longitudinal direction 11a, the smaller the spring constant required to make a nozzle 10 that closes at the same tank back pressure.

The cumulative friction of the components of the nozzle 10 determines to a large degree the precision of the nozzle's 10 shut off capability. Moreover, high friction loads may stop a nozzle 10 that has started to close before the job is finished. By minimizing side loadings, and reducing grit build up on sliding surfaces 90, 100, the present invention maintains a low cycling friction. The piston biasing member 156 and flare angle 70 therefore control what tank back pressure is necessary for closure. The balance between the piston biasing member 156 and flare angle 70 may easily be selected to provide a precise closure pressure. As a result, the nozzle 10 is able to consistently close at a selected tank pressure, independent from volumetric flow rate. Furthermore, the low cycling friction allows the nozzle 10 in accordance with the present invention to completely close, once the closing motion is begun.

Referring to FIG. 7, the nozzle 10 is in an "off" position. The locking pin 200 and the locking edge 210 are combined to prevent the on/off lever 178 from inadvertently returning to the "on" position. Fluid will not flow in this position even if an adapter 33 were admitted.

The lever arms 183 are rotated until they come in contact with the stop 196 on the link 184. Thus, the piston 148 can move no further toward the proximal end 14 of the nozzle 10. The biasing member 96 maintains the tubular assembly 34 and, in particular, the universal seal 44 firmly seated against the poppet valve 52. The stop 76 on the stem 66 prevents the poppet 52 from overly compressing the universal seal 44.

The retainer sleeve 118 is illustrated in a "retracted" position. Thus, the locking teeth 114 are free to deflect outwardly to either release or engage an adapter 33 or a dust cap.

The weakened fracture line 142 is clearly visible in FIG. 7. Should a careless driver drive away with the nozzle 10 still attached, the receiver 32 will fail at the fracture line 142 and propagate to the recess groove securing the retainer locking ring 122. The retainer 112 is then able to separate and the biasing member 130 will jettison to the retainer sleeve 118. In the event of a failure, enough of the receiver 32 would remain to protect the tubular assembly 34 and poppet valve 52 regardless of whether the nozzle 10 is in the "on" or "off" position. If the nozzle 10 is "on," once the receiver 32 fails along the fracture line 142 and the adapter 33 is pulled away, the biasing member 96 simply advances the tubular assembly 34 and seats the poppet valve 52 on the universal seal 44 to stop flow. As a result, a nozzle 10 in accordance with the present invention may prevent large scale fuel spills.

Figure 8:
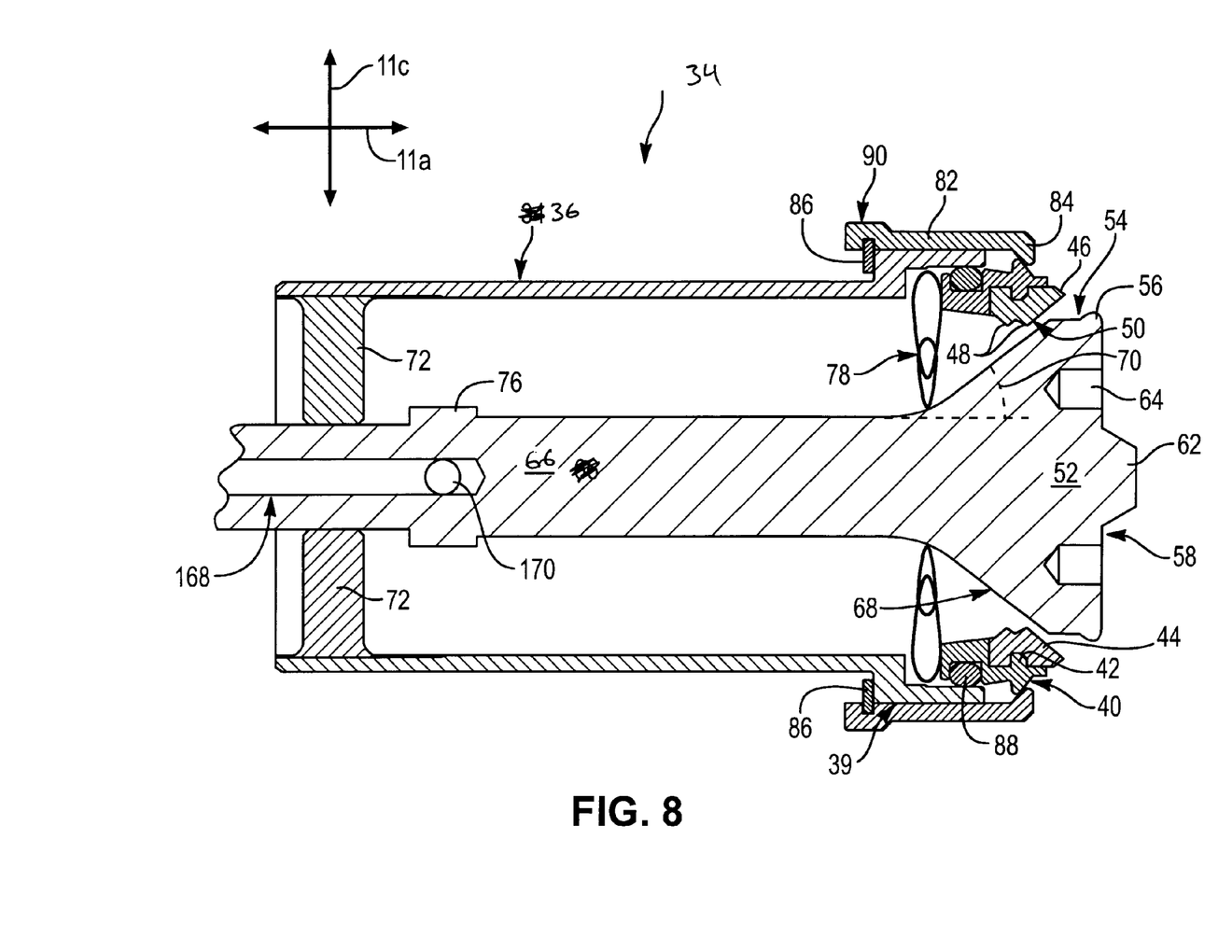
FIG. 8 is a cut-away, side elevation view of an embodiment of a tubular assembly and poppet valve in accordance with the present invention with the poppet valve spaced slightly from the sealing collar.
Figure 9:
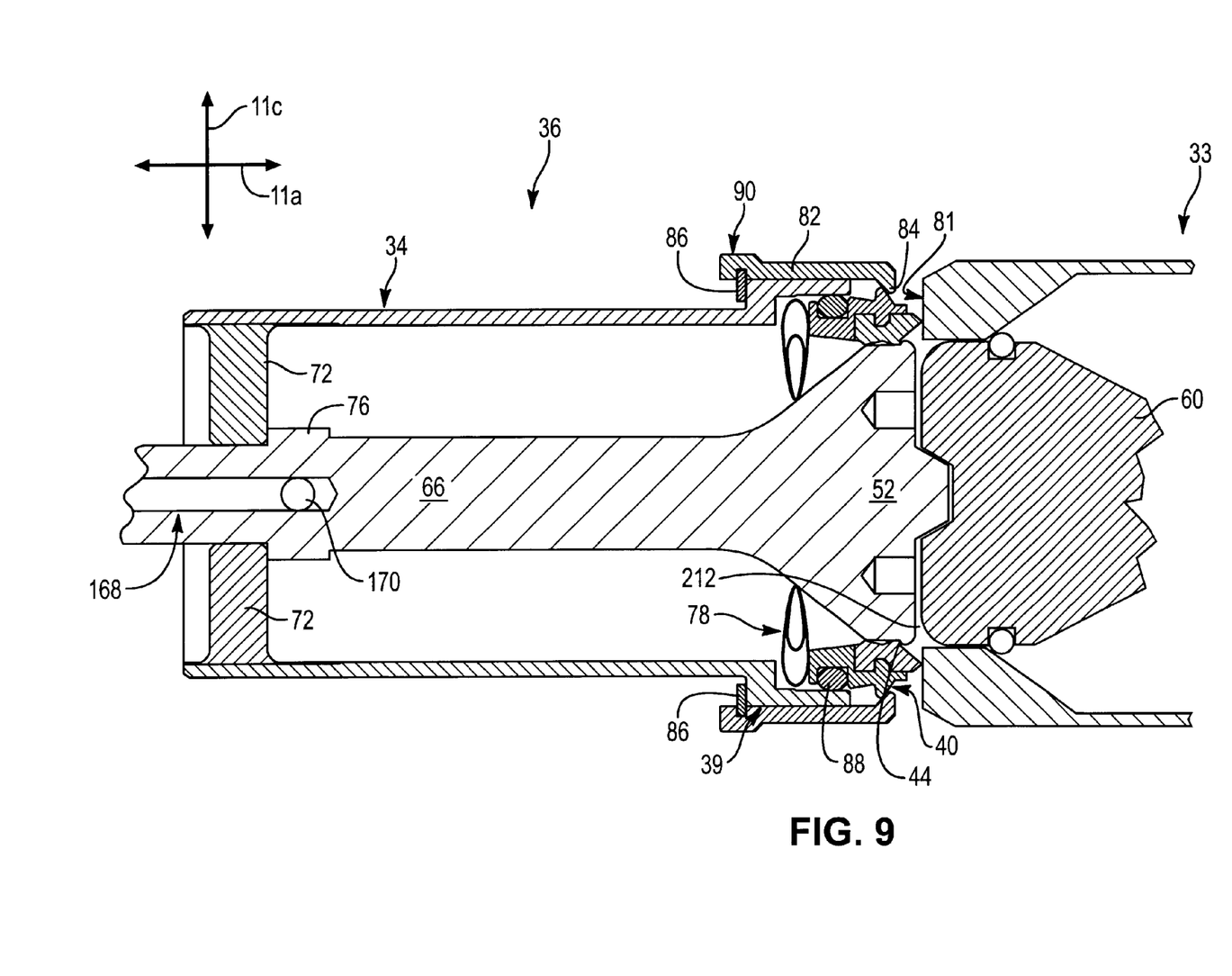
FIG. 9 is a cut-away, side elevation view of an embodiment of a tubular assembly and poppet valve abutting an adapter in accordance with the present.

Referring to FIGS. 8 and 9, a nozzle 10 in accordance with the present invention may stop the flow of fluid before opening the system. That is, the poppet valve 52 may seal with the circumferential seal 48 before the abutment seal 46 is separated from the end face 81 of the adapter 33 and the system opens to the surroundings. This feature allows the nozzle 10 to prevent the pressurized fluid spray that typically escapes when a system opens and seals at the same time.

When closing, the first contact between the poppet valve 52 and the universal seal 44 is made between the inner diameter surface 54 and the circumferential seal 48. As a poppet valve 52 is seated in the universal seal 44, the circumferential seal 48 slides in a longitudinal direction 11a along the inner diameter surface 54. The friction between the two is not sufficient to overcome the biasing member 96 and cause the tubular assembly 34 to move away from the adapter. Thus, by the time the abutment seal 46 separates from the end face 81 and open the system, the circumferential seal 48 has been stopping flow for some period of time. The width (measured in the longitudinal direction 11a) of the inner diameter surface 54 determines how much in advance of the system opening, the circumferential seal 48 seats.

The abutment seal 46 of the present invention may be dimensioned to greatly limit the amount of residual fluid present when a nozzle 10 separates. Residual fluid is the fluid that is neither in the nozzle 10 nor in the adapter 33 after both have closed. A certain amount of residual fluid will always be present. However, the abutment seal 46 may be positioned nearly co-planar with the face 58 of the poppet 52 to create a minimal residual gap 212. It may be desirable to leave the residual gap 212 between the opposing poppet valves 52, 60 to permit compression of the abutment seal 46 for proper sealing. Thus, before any poppet (52 or 60) moves, a proper system seal is achieved.

Figure 10:
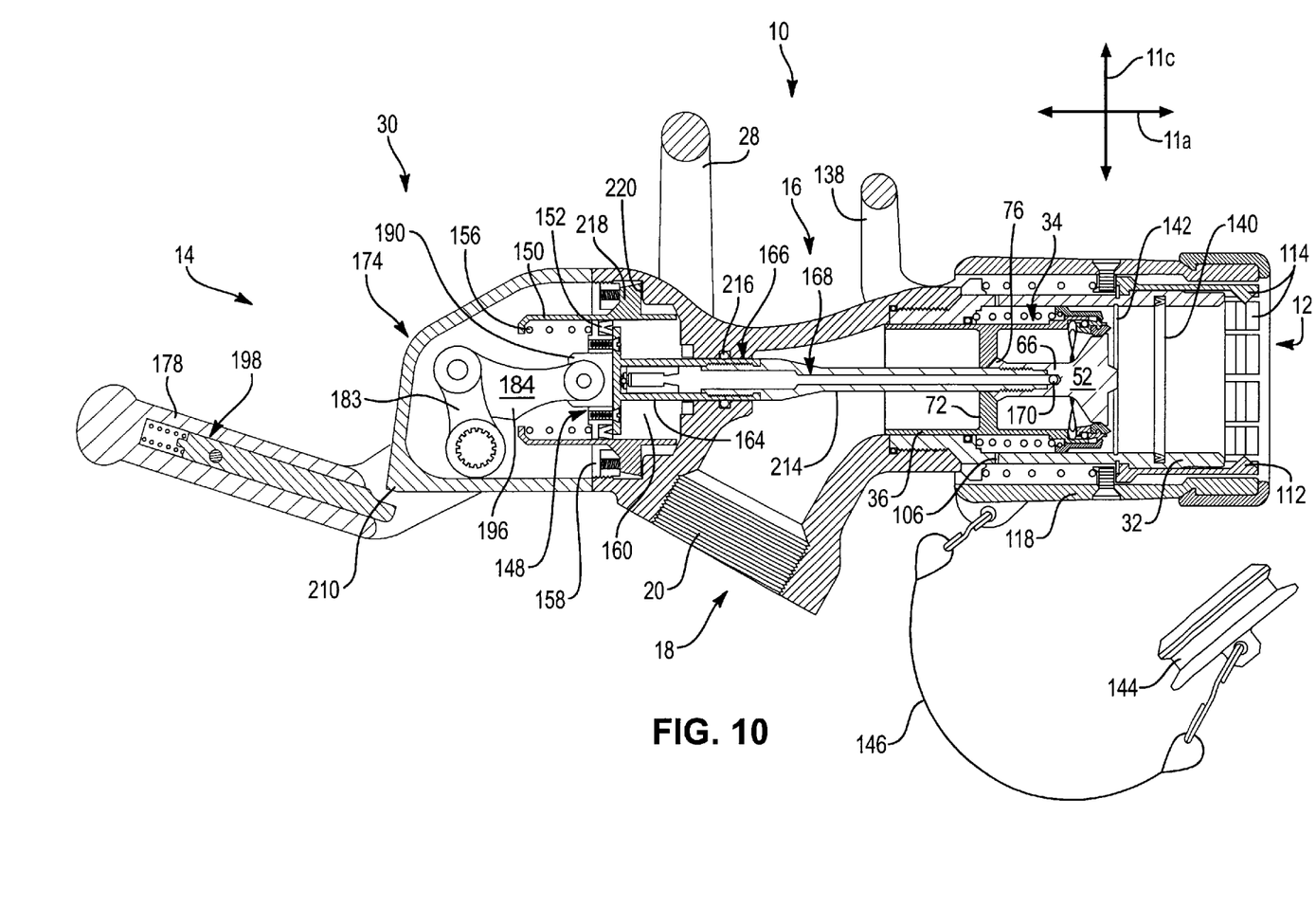
FIG. 10 is a cut-away, side elevation view of an alternative embodiment of a nozzle in accordance with the present invention in the "off" position.

Referring to FIG. 10, in an alternative embodiment, various components of the present invention may be altered or omitted as desired. For example, the spokes 72 may be positioned centrally within the tube 36. A shortened stem 66 may necessitate a stem extension 214. An "O-ring" seal 216 may be placed in along the piston extension aperture 166 to resist fluid from entering the piston chamber 160 from a location other than the pipette conduit 168. A threaded locking ring 158 may be used to force a shoulder of the piston cylinder 150 against the body 16. If necessary, a flat seal 220 may resist the escape of fluid from the chamber 160 at the seam between the piston cylinder 150 and the body 16.

In certain alternative embodiments, an alignment extension 164 may be omitted and the piston 148 may extend substantially in the lateral and traverse directions 11b, 11c and not overlap. If desired, the stop 196 on the link 184 may be shaped to engage the shaft 180 to stop rotation thereof.

Figure 11:
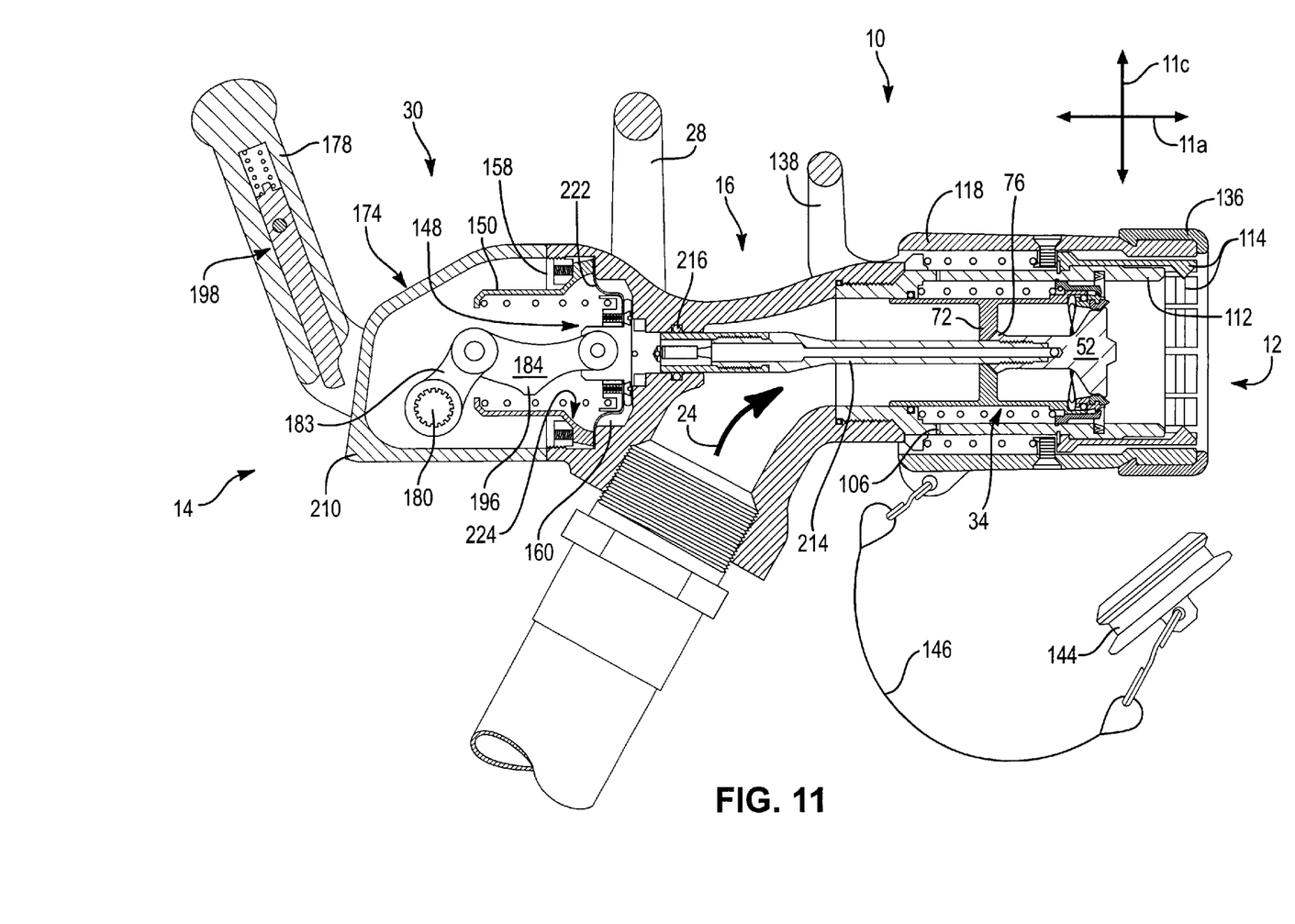
FIG. 11 is a cut-away, side elevation view of an alternative embodiment of a nozzle in accordance with the present invention in the "on" position without an adapter attached.

Referring to FIG. 11, in selected embodiments, the piston 148 may operate with a circular diaphragm 222. The piston 148 may secure to the center of the diaphragm 222. The piston cylinder 150 may provide a shoulder 218 to clamp the outer edges of the diaphragm 222 against the body 16. Thus, as the piston chamber 160 is pressurized, the diaphragm 222 is forced toward the proximal end 14 of the nozzle 10, taking the piston 148 along with it. The piston cylinder 150 may have a curved surface 224 to support the diaphragm 222 once it has fully extended towards the proximal end 14 of the nozzle 10.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A closed circuit fuel nozzle having longitudinal, lateral, and transverse directions for engaging an adapter on a fuel tank, the nozzle comprising;

a body comprising an inlet aperture, a tubular assembly extending in the longitudinal direction having a proximal end and a distal end, an outlet aperture, and walls forming a closed flow path from the inlet aperture to a tubular assembly, the distal end of the tubular assembly forming the outlet aperture;

the tubular assembly comprising a tube extending in the longitudinal direction and a sealing collar secured proximate the distal end to form the outlet aperture;

an articulator comprising a wave spring providing resilient articulation of the sealing collar with respect to the tube about lateral and transverse axes extending in the lateral and transverse directions, respectively;

a biasing member urging the tubular assembly distally in the longitudinal direction, the biasing member comprising a coil spring aligned with the longitudinal direction to encircle the exterior of the tube; and a poppet valve selectively translatable in the longitudinal direction and shaped to stop flow through the body when seated against the sealing collar in the longitudinal direction.

2. The nozzle of claim 1, wherein the closed flow path through the body is defined exclusively by the inlet aperture, the walls, the tube, and the outlet aperture.

3. The nozzle of claim 2, wherein the biasing member is positioned outside the flow path.

4. The nozzle of claim 1, further comprising an actuator connected to the poppet valve to provide motion in the longitudinal direction thereto in response to a pressure communicated from the flow path.

5. The nozzle of claim 3, further comprising an actuator connected to the poppet valve to provide motion in the longitudinal direction thereto in response to a pressure communicated from the flow path.

6. The nozzle of claim 5, wherein the poppet valve further comprises a stem extending in the longitudinal direction to engage the actuator, the stem having a pipette conduit formed substantially longitudinally therethrough to communicate the pressure within the flow path to the actuator.

7. The nozzle of claim 6, wherein the actuator includes a piston translating in the longitudinal direction in response to the pressure communicated from the flow path via the pipette conduit to a selected side of the piston.

8. The nozzle of claim 7, wherein the biasing member provides resilient translation in the longitudinal direction of the tubular assembly with respect to the inlet aperture.

9. The nozzle of claim 8, wherein the biasing member provides resilient translation of more than 0.5 inches of the tubular assembly with respect to the inlet aperture.

10. The nozzle of claim 8, wherein the tubular assembly further comprises a clamp to mechanically limit translation in the longitudinal direction of the sealing collar with respect to the tube.

11. The nozzle of claim 1, wherein the tubular assembly further comprises a clamp to mechanically limit translation in the longitudinal direction of the sealing collar with respect to the tube.

12. The nozzle of claim 4, wherein the poppet valve further comprises a stem extending in the longitudinal direction to engage the actuator, the stem having a pipette conduit formed substantially longitudinally therethrough to communicate the pressure within the flow path to the actuator.

13. The nozzle of claim 1, wherein the biasing member provides resilient translation in the longitudinal direction of the tubular assembly with respect to the inlet aperture.

14. The nozzle of claim 12, wherein an inlet to the pipette conduit is positioned inside the flow path at a position selected to balance the vacuum created in the pipette by the velocity of a fluid passing over the inlet and the head pressure of the fluid in the flow path.

15. A closed circuit fuel nozzle having longitudinal, lateral, and transverse directions for engaging an adapter on a fuel tank, the nozzle comprising:

a body comprising an inlet aperture, a sealing collar, and walls forming a closed flow path from the inlet aperture to the sealing collar;

a poppet valve selectively translatable in the longitudinal direction and shaped to stop flow through the body when seated against the sealing collar in the longitudinal direction;

a receiver secured to the body and shaped to admit the adapter and align the adapter with the sealing collar, the receiver having a weakened fracture line positioned a selected distance from the flow path;

a retainer positioned external to the receiver to selectably engage the adapter and longitudinally secure the adapter with respect to the receiver; and a biasing member positioned to urge the retainer into engagement with the adapter and to jettison the retainer from the nozzle upon failure of the weakened fracture line.

\* \* \* \* \*